Dec. 16, 1952      J. A. MAIZE      2,622,116

THERMOELECTRIC DEVICE

Filed May 13, 1950

INVENTOR
JAMES A. MAIZE
BY Edward B. Gregg
ATTORNEY

Patented Dec. 16, 1952

2,622,116

UNITED STATES PATENT OFFICE 2,622,116

THERMOELECTRIC DEVICE

James A. Maize, Redwood City, Calif., assignor to Edward B. Gregg, San Francisco, Calif.

Application May 13, 1950, Serial No. 161,888

16 Claims. (Cl. 136—4)

This invention relates to thermo-electric devices and to a method of forming the same.

Heretofore, thermocouples and other similar thermo-electric devices employing hot and cold junctions of dissimilar metals have been useful for purposes of temperature and electric current measurements but have been valueless, or of very little value, as a useful source of power. Batteries or electric accumulators provide a useful source of power but have the disadvantages of a limited useful life, the necessity of frequent recharging, and rather large bulk and weight per unit of power output.

It is an object of the present invention to provide certain novel and improved thermo-electric devices which are capable of generating an electric current upon the application of heat.

It is a further object of the invention to provide thermo-electric devices which are capable of converting thermal energy into electric energy and which provide a more practical source of power than thermocouples which have been available heretofore.

It is a still further object of the invention to provide thermo-electric converters capable of converting thermal energy into electric energy with substantially greater efficiency than has been possible heretofore.

It is a further object of the invention to provide a means whereby a small thermo-electric cell no larger than a small flashlight cell is capable of converting thermal energy into electric energy at a relatively high voltage and at a relatively high current value capable of satisfying light power requirements.

These and other objects of the invention will be apparent from the ensuing description and the appended claims.

In accordance with the present invention, I provide what I call an active barrier or junction of two dissimilar metals, one of which is relatively electro-positive and the other relatively electro-negative. These metals may both be above hydrogen in the electromotive series, for example, zinc and iron, or both may be below hydrogen, for example, copper and silver. Usually one of the metals is above hydrogen and the other is below hydrogen, for example, zinc and silver. Hereinafter, the terms electro-positive and electro-negative, as used to characterize the dissimilar metals of my active barrier, will be understood in this sense, unless such terms are otherwise qualified.

This active barrier is formed electro-chemically in the manner which will now be described.

A suitable compound of an electro-positive metal, for example the oxide, chloride or iodide, and a suitable compound, generally the oxide, of an electro-negative metal are provided. Separate layers of these compounds are placed in juxtaposition to provide a junction or phase boundary therebetween. In some embodiments of my invention, I prefer to provide a membrane or physical barrier, such as paper or glass cloth, at this junction, i. e., between the layers of metal compounds. These layers of metal compound, and the physical barrier if such be present, are impregnated with a suitable electrolyte, preferably an oxygen carrier such as an aqueous solution of potassium hydroxide. Alternatively (and in some cases preferably), the layers of metal compound are fused. A direct current voltage is then applied to the impregnated or fused layers by connecting the electro-negative side of the junction to the positive terminal of a battery or other suitable D. C. source, and the electro-positive side of the junction to the negative terminal. The voltage should not be so high that it will cause excessive current flow and thereby decompose the compounds. This treatment is continued, preferably at ambient temperature, for a time sufficient to produce the desired active barrier at the junction. Electrically this is indicated by a drop in the current and chemically by the formation of a complex compound or compounds at the junction. The complex compound or compounds are, in many cases, visible as a gray deposit.

Certain forms of the invention are illustrated by way of example in the accompanying drawing. Referring to the drawing:

Figures 1 to 4, inclusive, illustrate the manner of preparation of a cell which constitutes one embodiment of the invention. In this group of figures, Figure 1 is a perspective view of a casing or can for the cell containing a moist electrolyte mixture.

Figure 1:
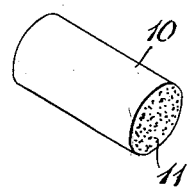

The invention will be more fully understood by referring to the accompanying drawings, which are diagrammatic views showing the several stages in producing the thermo-electric devices of the invention and also the finished products thereof.

Referring now to the drawings and more particularly to Figures 1 to 6 thereof, one form of thermo-electric device constructed in accordance with the invention is there illustrated. A cylindrical casing or can 10 is provided which may be a small zinc casing such as used for flashlight cells. This is filled with chemically pure zinc oxide powder which is indicated as 11 and the zinc oxide is then treated with 20% aqueous potassium hydroxide solution to produce a paste.

Figure 2:
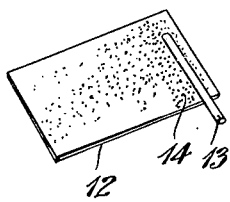
Figure 2 is a perspective view of a strip of paper and a central electrode which are used in the construction of the complete cell.
Figure 3:
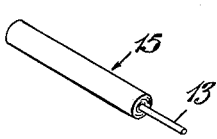
Figure 3 is a perspective view of the paper and electrode of Figure 2 with the paper coiled about the electrode.
Figure 4:
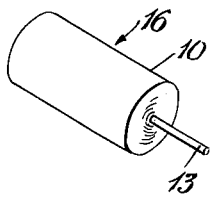
Figure 4 is a perspective view of the complete cell before the electro-chemical step has been carried out.

Referring now to Figure 2, a strip of paper or glass cloth 12 is laid out flat and a silver electrode 13 in the form of a slender bar or rod is laid across one end of the paper with one end of the rod projecting beyond an edge of the paper and the other end within the boundaries of the paper. Silver oxide powder, indicated as 14, is sprinkled on the paper in fairly copious quantities and the paper is rolled up about the silver electrode 13 into a roll 15 which is illustrated in Figure 3. Preferably, the silver oxide powder is sprinkled onto the paper as it is rolled up, rather than coating the entire surface of the paper while it is flat. The roll 15 is then plunged into the paste in the zinc casing 10 to provide a cell which is indicated as 16 in Figure 4.

Figure 5:
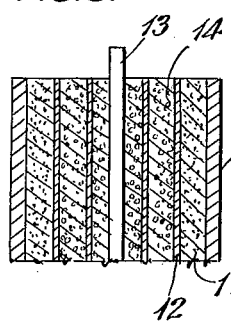
Figure 5 is a fragmentary, cross sectional view through the cell of Figure 4 on an exaggerated scale.

Referring now to Figure 5, which is a fragmentary, vertical section through the cell 16, it will be seen that the cell comprises an outer casing 10 of zinc which constitutes one electrode, an inner, axially arranged silver electrode 13, a thin layer 11 of zinc oxide paste adjacent the zinc casing, and several convolutions of paper 12 coated on their interior surfaces with silver oxide 14.

Figure 6:
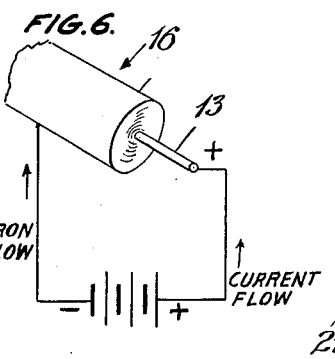
Figure 6 is a fragmentary view of the cell of Figure 4, showing also a circuit for forming the finished cell by electro-chemical means.

A D. C. voltage is applied to this cell as indicated in Figure 6. The voltage is adequate to cause a current flow of about 100 milliamps. In a typical case, about 2 volts is adequate. The direction of current flow, in the conventional sense, is indicated by the arrow designated as "current flow." The direction of electron flow through the external circuit is indicated by the arrow designated "electron flow." This electrochemical treatment is continued for at least 24 hours at ambient temperature, or until a slight decline in the flow of current is noted, which is indicative of the activation of the barrier and the formation of a deposit of what I believe is a zinc-silver-oxygen compound or complex, in the paper 12. This treatment may continue for a time sufficient to dry the paste and solution, or the drying may be accomplished by thermal means.

The device so produced may be regarded as a voltaic cell in that it has an electromotive force at ambient temperatures, but it is more than a voltaic cell in that it behaves as a thermocouple or thermopile. Thus, on the application of heat by an open flame or a heated bath to heat the device to about 70° C., it develops a much greater E. M. F., about 3/4 to 1 volt. The maximum current output is about 100 milliamps and the optimum current output, consistent with a long life, is about 50 milliamps. The polarity of this device, employing conventional terminology, is positive for the silver electrode and negative for the zinc electrode; that is, the zinc is the cathode and the silver is the anode.

This device is useful wherever light D. C. power requirements exist; e. g., in connection with portable or even larger radio receivers operated on a D. C. source of power, Geiger counters, other forms of measuring instruments and control instruments. The dimensions of a single unit are quite small and the useful current output relatively large. By connecting several of these units in series, both the power and the voltage necessary for many purposes are provided within very small compass. Only a source of thermal energy is necessary, and this may be an open flame, a heated bath, etc. The efficiency of the device is about 20% based on the input of thermal energy, compared to an efficiency for conventional thermocouples of about 1 to 3%. Also, to provide a terminal voltage of five volts would require a pile of about 3500 couples in a conventional device, compared to about five units constructed as described above.

Figure 7:
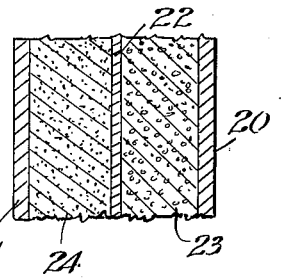
Figure 7 is a cross sectional view through an assembly for preparing another and simpler form of the cell.
Figure 8:
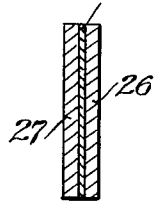
Figure 8 is a cross sectional view through a finished cell prepared in accordance with the procedure illustrated in Figure 7.

A simpler form of a thermo-electric device is illustrated in Figures 7 and 8. Referring to Figure 7, a silver plate 20 and a zinc plate 21 are provided and are arranged in spaced, parallel relation. The zinc plate 21 may, if desired, be replaced by any other suitable conductor, for example, by another silver plate. A porous membrane or physical barrier 22 is also provided and is supported between the outer plates or electrodes 20 and 21. The space between the membrane 22 and the electrode 20 is packed with silver oxide, indicated as 23, and the space between the membrane 22 and the electrode 21 is packed with chemically pure zinc oxide, indicated as 24. A D. C. voltage is applied to this cell in the manner described above with reference to Figures 1 to 6, the voltage being sufficient to produce a current density of about 100 milliamps.

The membrane 22 is converted by this treatment into an active barrier which is shown in Figure 8 and is there identified as 25. It is removed bodily from the cell shown in Figure 7 and is sandwiched between two electrodes 26 and 27. These electrodes are preferably silver and zinc, respectively, but any other suitable conducting materials may be used.

The thermocouple of Figure 8 is not as efficient as that produced in the manner described with reference to Figures 1 to 6, but it is nevertheless operable and useful and it illustrates the basic character and structure of the thermo-electric devices of the present invention.

The metal compounds or couples used in forming the thermo-electric devices of Figs. 6 and 7 were zinc oxide and silver oxide. Other couples may be used instead of the ZnO-Ag$_2$O couple with appropriate changes in the electrolyte and the electrodes. Examples of other couples are ZnO-SeO$_2$; ZnO-PbO$_2$; ZnO-Bi$_2$O$_3$; Bi$_2$O$_3$-PbO$_2$; MnO-Ag$_2$O; CdO-PbO$_2$; Fe$_2$O$_3$-PbO$_2$; Fe$_2$O$_3$-NiO$_2$; CuO-PbO$_2$; ZnO-HgO$_2$; ZnCl$_2$-Ag$_2$O; ZnI$_2$-Ag$_2$O; CuS-PbS; Fe$_2$S$_3$-CuS; CdS-Ag$_2$S; CdO-Ag$_2$O.

With most of these couples, aqueous KOH, NaOH or NH$_4$OH is a suitable electrolyte. In selecting an electrolyte, substances are preferred which act as oxygen carriers and which do not react with the metal compounds of the couple to produce irreversible chemical reactions. With the CuS-PbS couple, a very dilute aqueous solution of lead nitrate or a 25% aqueous solution of copper sulfate is preferred. With the Fe$_2$S$_3$-CuS couple, a 25% aqueous copper sulfate solution is preferred. With the CdO-Ag$_2$O couple, a 1.5% aqueous sulfuric acid solution or a 20% KOH solution may be used. With the CdS-Ag$_2$S couple, a dilute (e. g., 0.5%) aqueous sulfuric acid solution may be used. With a CuO-PbO$_2$ couple, an aqueous copper sulfate solution may be used. With a ZnO-SeO$_2$ couple, an aqueous MgSO$_4$ solution may be used.

In each of the couples referred to hereinabove, the left hand member (e. g., ZnO in the ZnO-SeO$_2$ couple) contains the electro-positive metal and will, therefore, be adjacent the negative electrode during the forming operation.

The forming characteristics of a typical cell are set forth in the table below. The cell used was assembled as follows: a sheet of zinc was mounted on wood. A layer of aqueous ZnO-KOH paste was applied to the exposed surface of the zinc, to a thickness of $\tfrac{1}{32}$ inch. A sheet of glass cloth was then laid over the ZnO paste and a layer of aqueous Ag$_2$O-KOH paste, $\tfrac{1}{16}$ inch thick, was laid over the glass cloth. Then a silver plate was laid over the Ag$_2$O paste. A battery having an open circuit voltage of 1.85 was used to form the cell electrolytically.

*Table*

| Time lapsed, minutes | Voltage across cell | Current/ sq. cm. |
| --- | --- | --- |
|  |  | *Amps.* |
| 0 | 1.75 | 0.087 |
| 45 | 1.70 | 0.100 |
| 90 | 1.68 | 0.110 |
| 135 | 1.65 | 0.120 |
| 190 | 1.62 | 0.135 |
| 250 | 1.61 | 0.100 |
| 310 | 1.60 | 0.140 |
| 360 | 1.47 | 0.250 |

Figure 9:
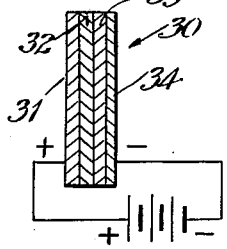
Figure 9 is a cross sectional view of an assembly, including an energizing or forming circuit, for the preparation of a photo-electric generator in accordance with the invention.

Referring now to Figure 9, a photoelectric generator is there illustrated, which is indicated generally as 30. This generator comprises a silver base plate 31 coated with a very thin layer 32 of selenium dioxide which may be applied to the base plate by fusing the selenium dioxide under pressure in an oxygen atmosphere and spreading it as a very thin layer while in the fused state. A very thin layer 33 of zinc oxide or an oxide of some other electro-positive metal is then applied to the surface of the selenium dioxide layer. Finally, a layer 34 of silver is applied to the surface of the zinc oxide. Preferably the silver layer 34 is formed by sputtering silver onto the zinc oxide to form a monomolecular layer or a layer of the order of monoatomic thickness. The cell 30 is then heated, as with an acetylene torch to fuse the oxides and it is treated or formed electro-chemically while in the fused state. The forming circuit is shown in Figure 9. About two volts is employed to form the cell.

Figure 10:
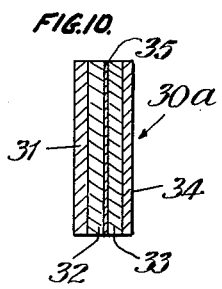
Figure 10 is a cross sectional view through a finished photo-electric generator constructed and formed in accordance with Figure 9.

Referring now to Fig. 10, a finished photoelectric unit 30a is illustrated which includes an active barrier 35. A number of these units may be stacked in series to provide a photoelectric generator. When subjected to ultraviolet radiation, or to sunlight or even diffused daylight, such a generator will generate an E. M. F. of about 0.5 volt per unit. The photoelectric efficiency is of the order of 6%. The current output of a cell 2½ inches in diameter is about 20 milliamps.

Figure 11:
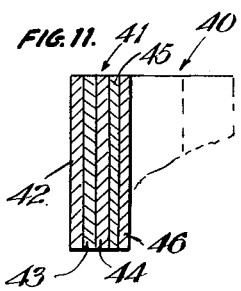
Figure 11 is a fragmentary cross sectional view of a pile containing a plurality of photo-electric generator units constructed in accordance with the invention.

Referring now to Figure 11, a pile 40 is there illustrated comprising a plurality of units 41 which are in electrical contact with one another, being connected in series. Each unit 41 comprises a silver electrode 42, a thin layer of silver oxide 43, an active barrier 44 which is formed in accordance with the present invention, a layer 45 of zinc oxide and a thin plate or coating of silver 46. The active barrier 44 maybe formed separately and then sandwiched between the silver oxide and zinc oxide layers or it may be formed in situ; i. e., a porous physical barrier or membrane may be placed between the zinc oxide and silver oxide layers which are in turn provided with plates of electro-positive and electro-negative metal, and the assembly is then treated electro-chemically in the manner described above.

Any number of the units 41 may be arranged in stacked or end-to-end relationship and in electrical contact with one another. Since each unit may be very thin, a pile can be readily provided which is capable of generating 100 volts or more, yet occupies very little space. For example, each of these units will generate approximately one volt and 8 to 16 of the units can be packed together within the space of one inch. Accordingly, a thermopile is provided which can generate several hundred or a thousand volts, yet occupy very little space. The current capacity of such a pile will, of course, depend upon the cross-sectional area of the unit 41.

Figure 12:
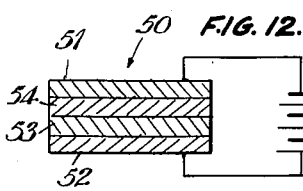
Figure 12 shows an assembly, and an energizing or forming circuit therefor, for forming an oscillator in accordance with the invention.
Figure 13:
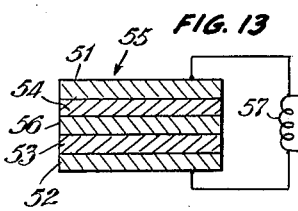
Figures 13 and 14 show the oscillator formed in accordance with the procedure of Figure 12, together with simple circuits therefor.
Figure 14:
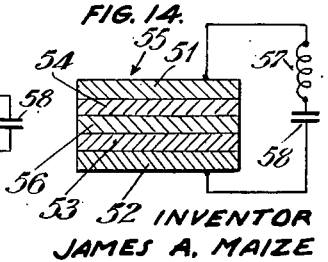

Referring now to Figures 12, 13 and 14, there is shown an embodiment of the invention which is adapted to use as an oscillator. Referring to Figure 12, an assembly 50 is formed comprising spaced electrodes 51 and 52 (e. g. silver plates), a thin layer of lead dioxide 53 and a thin layer of zinc oxide or bismuth oxide 54. A porous barrier or membrane may or may not be provided between the layers 53 and 54, as desired. The oxide layers are then fused and the cell is formed electro-chemically while the oxides are in the fused state, by applying a D. C. voltage of about 1500 volts for a period of about eight hours. An oscillator unit 55 is thus provided (see Fig. 13), which includes an active barrier 56. A number of the units 55 may be stacked in series relationship and included in a circuit such as those shown in Figures 13 and 14, in which 57 indicates an inductance and 58 indicates a capacitance. A thermo-electric oscillating circuit is thus provided. When heat is applied to the stacked units 55, current will flow from the lead dioxide layer 53 through the active barrier 56 to the zinc oxide or bismuth oxide layer 54, during the thermal cycle. The capacitance 58 will then discharge in the opposite direction, after which the thermal cycle will be repeated, etc. Frequencies up to 450 kilocycles when the units 55 are of very small dimensions, can be produced. A useful means for producing alternating current is thus provided.

It will be understood that in Figures 12, 13 and 14, as well as in Figures 1 to 11, an exaggerated scale is sometimes employed for purposes of clarity.

In the several methods described above and illustrated in the drawings, of forming thermo-electrically or photo-electrically active cells, the forming current density is generally rather low, i. e., of the order of 0.1 amp./sq. cm. Lower or higher current densities may be employed. The formation of the active barrier or thermo-electrically active junction occurs at a greater rate when a higher current density is employed. However, unduly high current densities are undesirable because they cause decomposition.

It will be apparent that a novel method of forming thermocouples or thermo-electric converters, and a novel type of cell having thermo-electric and/or photo-electric properties, have been provided. The method of cell formation is simple and the resulting cells combine a number of desirable features, such as compactness, a long useful life and a relatively high power and voltage output.

I claim:

1. A method of forming an electrically active couple, which comprises providing a junction of a compound of a relatively electro-positive metal and a compound of a relatively electro-negative metal, passing a direct electric current through said junction from the side of the electro-negative metal to the opposite side of the junction, and continuing the passage of current at a rate and for a time sufficient to produce an electro-chemical change at the junction and thereby form a junction which is a thermo-electric converter.

2. A method of forming an electrically active couple, which comprises providing a junction of a compound of a relatively electro-positive metal and a compound of a relatively electro-negative metal, impregnating said compounds with a liquid electrolyte, and passing a direct electric current through said junction from the side of the electro-negative metal to the opposite side of the junction, and continuing the passage of current at a rate and for a time sufficient to produce an electro-chemical change at the junction and to form a junction which is a thermo-electric converter.

3. A method of forming an electrically active couple, which comprises providing a junction of a compound of a relatively electro-positive metal and a compound of a relatively electro-negative metal, fusing said compounds, and passing a direct electric current through the fused compounds and junction from the side of the electro-negative metal to the opposite side of the junction, and continuing the passage of current at a rate and for a time sufficient to produce an electro-chemical change at the junction and to form a junction which is a thermo-electric converter.

4. A method of forming an electrically active couple which comprises forming an assembly comprising a layer of a compound of a relatively electro-positive metal, a layer of a compound of a relatively electro-negative metal and a porous membrane at the junction of said compounds, passing a direct electric current through said junction from the side of the electro-negative metal to the opposite side of the membrane, and continuing the passage of current at a rate and for a time sufficient to produce an electro-chemical change at the junction and to form a junction which is a thermo-electric converter.

5. A method of forming an electrically active couple, which comprises providing a junction of a compound of a relatively electro-positive metal and a compound of a relatively electro-negative metal, said compounds being selected from the group consisting of oxides and sulphides, passing a direct electric current through said junction from the side of the electro-negative metal to the opposite side of the junction, and continuing the passage of current at a rate and for a time sufficient to produce an electro-chemical change at the junction and to form a junction which is a thermo-electric converter.

6. A method of forming an electrically active couple, which comprises providing a junction of an oxide of a relatively electro-positive metal and an oxide of a relatively electro-negative metal, passing a direct electric current through said junction from the side of the electro-negative metal to the opposite of the junction, and continuing the passage of current at a rate and for a time sufficient to produce an electro-chemical change at the junction and to form a junction which is a thermo-electric converter.

7. A method of forming an electrically active couple which comprises providing a junction of zinc oxide and silver oxide, passing a direct electric current through said junction from the silver to the zinc side thereof, and continuing the passage of current at a rate and for a time sufficient to produce an electro-chemical change at the junction and to form a junction which is a thermo-electric converter.

8. A method of forming a thermo-electric cell, which comprises providing a zinc electrode and a silver electrode, interposing a layer of zinc oxide and a layer of silver oxide between said electrodes with the zinc oxide adjacent the zinc electrode and the silver oxide adjacent the silver electrode, also providing a porous membrane at the junction of the zinc and silver oxides, treating the oxides to render them electrically conductive, applying a direct current voltage to the assembly with the zinc electrode as the cathode and the silver electrode as the anode, continuing such treatment at a current value sufficient to activate the cell and impart thermo-electric properties thereto, and drying the cell.

9. A device of the character described, comprising spaced electrodes and a conducting medium therebetween and in electrical contact therewith, said medium including a porous membrane impregnated with the product of electro-chemical treatment of a junction between compounds of dissimilar, relatively electro-negative and electro-positive metals, said impregnated membrane having thermo-electric properties.

10. A thermo-electric device of the character described, comprising a cell including spaced electrodes, a layer of a compound of a relatively electro-positive metal adjacent one electrode, a layer of a compound of a relatively electro-negative metal adjacent the other electrode and a junction between said layers formed by electrochemical treatment of a junction of said compounds by the method of claim 1.

11. A thermo-electric device comprising a container forming an electrode and having an inner surface of zinc, a silver electrode disposed within said container but without direct contact therewith, a layer of zinc oxide adjacent said inner surface, a layer of silver oxide adjacent said silver electrode, and a junction interposed between said layers, said junction being formed in situ by treating said oxides to render them electrically conductive, applying a direct current voltage to the device to cause flow of current from the silver to the zinc electrode, and continuing such treatment for a time and at a current level sufficient to cause a substantial deposit of electro-chemical product at said junction.

12. A thermo-electric cell comprising a zinc container forming one electrode, a silver electrode disposed within said container without direct contact therewith, a coil of porous membrane disposed about said silver electrode, a layer of silver oxide coating the inner surface of the convolutions of said coil and the inner surface of the container, a layer of zinc oxide between the outer surface of the coil and the inner surface of the container, and a deposit in said membrane of a thermo-electrically active material formed in situ by passage of a direct current through the cell from the silver electrode to the zinc electrode.

13. A method of forming a photo-electric cell, which comprises providing a junction of thin layers of selenium dioxide and zinc oxide, fusing said layers and passing a direct current through the fused oxides from the selenium side to the zinc side of the junction.

14. A photo-electric cell comprising spaced electrodes, intervening thin layers of selenium dioxide and zinc oxide, and a photo-electrically active junction between said layers, said junction being formed in situ by the method of claim 13.

15. A method of forming a thermo-electrically active oscillator, comprising providing a junction of thin layers of lead dioxide and an oxide of a metal selected from the group consisting of zinc and bismuth, fusing said layers and passing a direct current through the fused layers from the lead side to the opposite side of the junction.

16. An oscillator comprising spaced electrodes, a thin layer of lead dioxide adjacent one electrode, a thin layer adjacent the other electrode of an oxide of a metal selected from the group consisting of zinc and bismuth, and a junction between said layers formed as in claim 15.

JAMES A. MAIZE.

REFERENCES CITED

The following references are of record in the file of this patent:

UNITED STATES PATENTS

| Number | Name | Date |
| --- | --- | --- |
| 1,751,361 | Ruben | Mar. 18, 1930 |
| 1,904,447 | Hambuechen | Apr. 18, 1933 |
| 2,137,428 | Van Geel et al. | Nov. 22, 1938 |
| 2,139,731 | De Boer et al. | Dec. 13, 1938 |
| 2,197,497 | Geisler | Apr. 16, 1940 |
| 2,289,152 | Telkes | July 7, 1942 |
| 2,446,237 | Mueller | Aug 3, 1948 |
| 2,469,569 | Ohl | May 10, 1949 |
| 2,487,279 | Stalhane | Nov. 8, 1949 |